(12) United States Patent
Grimm

(10) Patent No.: US 8,869,636 B2
(45) Date of Patent: Oct. 28, 2014

(54) METHOD AND APPARATUS FOR CHECKING GRIPPING ELEMENTS

(75) Inventor: Volker Grimm, Wenzenbach (DE)

(73) Assignee: Krones AG, Neutraubling (DE)

( * ) Notice: Subject to any disclaimer, the term of this patent is extended or adjusted under 35 U.S.C. 154(b) by 729 days.

(21) Appl. No.: 12/388,082

(22) Filed: Feb. 18, 2009

(65) Prior Publication Data

US 2009/0205448 A1 Aug. 20, 2009
US 2013/0228025 A2 Sep. 5, 2013

(30) Foreign Application Priority Data

Feb. 20, 2008 (DE) .......................... 10 2008 010 014

(51) Int. Cl.
*B65B 57/10* (2006.01)
*B65B 21/18* (2006.01)

(52) U.S. Cl.
CPC *B65B 21/18* (2013.01); *B65B 57/10* (2013.01)
USPC ........................................................ 73/865.8

(58) Field of Classification Search
None
See application file for complete search history.

(56) References Cited

U.S. PATENT DOCUMENTS

| | | | | |
|---|---|---|---|---|
| 4,816,730 A | * | 3/1989 | Wilhelm et al. | 318/568.22 |
| 5,364,146 A | * | 11/1994 | Brandorff et al. | 294/86.4 |
| 6,102,246 A | * | 8/2000 | Goulet et al. | 221/11 |
| 6,143,250 A | * | 11/2000 | Tajima | 422/553 |
| 6,520,318 B1 | * | 2/2003 | Humele | 198/483.1 |
| 6,889,119 B2 | * | 5/2005 | Riff et al. | 700/254 |
| 2009/0102477 A1 | * | 4/2009 | Sjoblom | 324/260 |

* cited by examiner

*Primary Examiner* — Robert R Raevis
(74) *Attorney, Agent, or Firm* — Novak Druce Connolly Bove + Quigg LLP

(57) ABSTRACT

A method and apparatus for checking gripping elements for containers may include a plurality of gripping elements for gripping a plurality of containers. Occupancy states of these gripping elements with containers are regularly detected and statistics regarding these occupancy states are formed. Based on these statistics, in particular a failure of individual gripping elements can be ascertained and can be output to the user in a targeted manner.

16 Claims, 2 Drawing Sheets

METHOD AND APPARATUS FOR CHECKING GRIPPING ELEMENTS

CROSS-REFERENCE TO RELATED APPLICATION

This application claims the benefit of priority of German Patent Application No. 10 2008 010 014.5, filed Feb. 20, 2008, pursuant to 35 U.S.C. 119(a)-(d), the disclosure of which is incorporated herein by reference in its entirety as if fully set forth herein.

TECHNICAL FIELD

The present disclosure relates to a method and apparatus for checking gripping elements for containers.

BACKGROUND

Gripping elements for containers, which are also referred to as gripping claws, have long been known from the prior art. Such conventional gripping elements are used, for example, to lift containers, such as bottles in particular, into or out of crates. Usually a plurality of such gripping elements are provided which grip, for example, a plurality of bottles arranged in the crate and transfer them to a different position. Such apparatuses may operate in a rhythmical manner as packing devices or as unpacking devices or else for combined uses. When packing, the containers firstly arrive on one or more container tables and are routed there, for example, into lanes. The containers are then picked up by gripping elements, moved into the packing position, and placed into empty crates which are waiting ready.

During these packing and unpacking processes, however, various errors may occur which lead to the situation whereby individual containers are not gripped. The causes of such failures may vary; for example, in the case of bottles with clip closures, the clip closures may hook onto the beverage crate or else the container may be damaged in such a way that it cannot be gripped properly. Another source of error lies in the fact that a specific gripping element is faulty and therefore the bottle in question cannot be gripped.

It may be desirable to provide a method and an apparatus which makes it easier to discover a specific source of error as to why gripping elements are not gripping containers.

SUMMARY OF THE INVENTION

In accordance with the disclosure, a method for checking gripping elements may include a step wherein a first plurality of containers are gripped by means of a plurality of gripping elements. In another step, a first occupancy state of at least one of the gripping elements with a container from the first plurality of containers is ascertained. In another step, a second plurality of containers are gripped by means of the plurality of gripping elements, and in another method step, a second occupancy state of the at least one gripping element with a container from the second plurality of containers is ascertained. The first occupancy state and the second occupancy state of the gripping element are compared with a reference value or a reference state.

The plurality of containers may be, for example, a predefined number of bottles, which are then inserted into a bottle crate. Furthermore, it may also be a plurality of bottles which are being removed from a bottle crate. With correspondingly larger installations, a plurality of bottles may also be distributed between whole rows of crates.

An occupancy state of the gripping elements is understood in particular to mean a distinction between whether a bottle is or is not located at the gripping element. However, other occupancy states would also be conceivable, such as for example a check with regard to an exact alignment of the containers relative to the gripping elements or the like. By comparing the two occupancy states of one and the same gripping element with the reference value, it is possible to deduce possible sources of error. For instance it would be possible to deduce, from the case in which the two occupancy states respectively indicate that the gripping element is not holding any bottle, that the gripping element in question is faulty.

The reference value may be in particular a nominal occupancy state, in particular, an occupied state. It is thus preferably ascertained whether a certain gripping element is or was respectively occupied by a container during the gripping processes in question.

If, for example, one occupancy state indicates that a container was held and the other indicates that no container was held, this might suggest that the container itself was faulty or could not be removed from the container for some other reason, such as for example due to a clip closure becoming stuck.

In one exemplary method according to the disclosure, the first occupancy states and the second occupancy states of all the gripping elements are ascertained. In this way it is possible to detect any faulty gripping elements in a simple manner.

In accordance with one aspect of the disclosed method, at least one occupancy state is stored.

According to various aspects of the disclosed method, a third occupancy state of the gripping element with a container from a third plurality of containers may be ascertained. It may also be possible to ascertain more than three occupancy states of one and the same gripping element in order in this way to form statistics regarding these occupancy states. However, even when forming these statistics, the individual occupancy states are ascertained and compared with one another. Therefore, a comparison of the occupancy states is additionally understood to mean that a plurality of occupancy states are recorded together, in particular in the context of statistics, and are compared with one another.

In some aspects of the disclosure, a functionality of the gripping element is deduced from the comparison between the first occupancy state and the second occupancy state with the reference state.

According to various aspects of the disclosed method, as mentioned above, the occupancy states of at least one gripping element, or a plurality of gripping elements, or all the gripping elements, may be statistically recorded. Consequently, the unoccupied gripping elements may be ascertained.

In an exemplary aspect of the disclosed method, the occupancy states are determined once the gripping elements have released the containers. For example, it is possible to check by means of a camera whether a certain position in a beverage crate is occupied by a container. If this is not the case, it can be deduced that the gripping element which should have filled this position was not occupied by a container. According to some aspects, however, this measurement takes place shortly before inserting the bottles into the beverage crates, in order in this way still to be able to ascertain the gripper group to which the faulty gripping element belonged.

For example, it is possible that four groups of gripping elements are provided which simultaneously fill with containers four crates arriving one behind the other. After being filled, the full crates are transported away and the next four crates are filled with containers. If the crates are checked immediately or at least very soon after being filled, it is possible to deduce a certain gripping element from a certain group of gripping elements.

The present disclosure also relates to an apparatus for checking gripping elements for containers, wherein this apparatus comprises a plurality of gripping elements for gripping a plurality of containers, and wherein at least one gripping element has a sensor device which detects an occupancy state of this gripping element with a container. According to the disclosure, the apparatus comprises a processor device which is configured in such a way that it compares with a reference state a first occupancy state of the gripping element with a first container from a first plurality of containers and a second occupancy state with a second container from a second plurality of containers.

The sensor device may be a magnetic sensor or also other sensor devices. A sensor device which detects, for example, an opening angle of gripping claws or the like may also be provided.

However, several types of check are possible. The function is considered to be the gripping and release and also the rotation of the bottle. It is additionally possible to arrange in each packing head a measured value pick-up which measures the resistance during packing. It is thus possible for example to measure whether the bottle makes contact during the packing process. Contact of the bottle means that a higher degree of wear is to be expected. As a result of a functional check, a digital state (good or bad) or an analog value is measured. However, other procedures for determining occupancy states are also possible. In particular, the sensor device may be provided directly on the gripping element.

In an exemplary embodiment, the processor device is designed in such a way that it statistically evaluates the occupancy states of at least one gripping element. As a result of this statistical evaluation, it is possible for example for a functionality of a certain gripping element to be ascertained. According to various aspects, each gripping element has a sensor device which detects an occupancy state of this gripping element with a container. In this way, the abovementioned statistics can be formed across all the gripping elements and thus a faulty gripping tool can quickly be discovered.

According to various aspects of the disclosure, the apparatus comprises a sensor device which retroactively detects an occupancy state of the gripping element with a container. After the packing or unpacking of the containers, the occupancy state can be determined by checking the crate of containers. The check takes place in particular in such a way as to ascertain whether all the containers are present in the crate or have been removed. This check can be carried out by means of a camera or sensors. The check is also still possible after the crates have moved a few meters. It would also be possible to observe the gripping device or the gripping element by means of a camera during the packing or unpacking process in order thus to monitor the function of the gripping elements.

In an exemplary embodiment, the apparatus comprises a memory device, in which the occupancy states of the gripping elements can be stored. By using this memory device, it is also possible to record histories of movement sequences of the apparatus.

According to some embodiments, the processor device is configured in such a way that it compares the occupancy states of all the gripping elements with the containers of the first plurality of containers with the occupancy states of all the gripping elements with containers of the second plurality of containers.

In accordance with various aspects, a display device is provided which outputs to the user the occupancy states of the individual gripping elements or statistics formed from these occupancy states. In this way, when carrying out a full-crate check, statistics can be created which show separate statistics for each gripping element. Based on these statistics, the operator can immediately detect any faulty gripping element. These statistics may be displayed by a display device such as a screen.

After determining the function of each gripping element or parts of gripping elements, measured values concerning the functions are available. The evaluation determines statistics for each gripping element and calculates the faults thereof. The number of faults per packing claw or gripping element can be measured, and in the case of analogue values also the mean value and the spread (Gaussian bell).

The compiled values can be displayed, transmitted to the packing/unpacking devices, and/or transmitted to an operating data acquisition unit. The compiling of the data may take place either in one or more decentralised control units or in the integrated control unit of the machine.

In addition, simple, semi-automatic, or fully automatic feedback mechanisms are also conceivable. If the system detects a non-tolerable fault, it may stop the measurement system of the machine and request fault correction. It would also be possible within the context of semi-automatic feedback to assist the user in correcting the fault. For instance, it would be possible for example for the gripping elements recognised as faulty to be extended, retracted, rotated or the like relative to the others, or else to be disconnected. Further functions which help the user to find the faulty gripping element more quickly are also conceivable.

Finally, it would also be conceivable that the machine automatically carries out a replacement of gripping elements recognised as faulty.

Further advantages and embodiments will emerge from the appended drawings.

DETAILED DESCRIPTION

Figure 1:
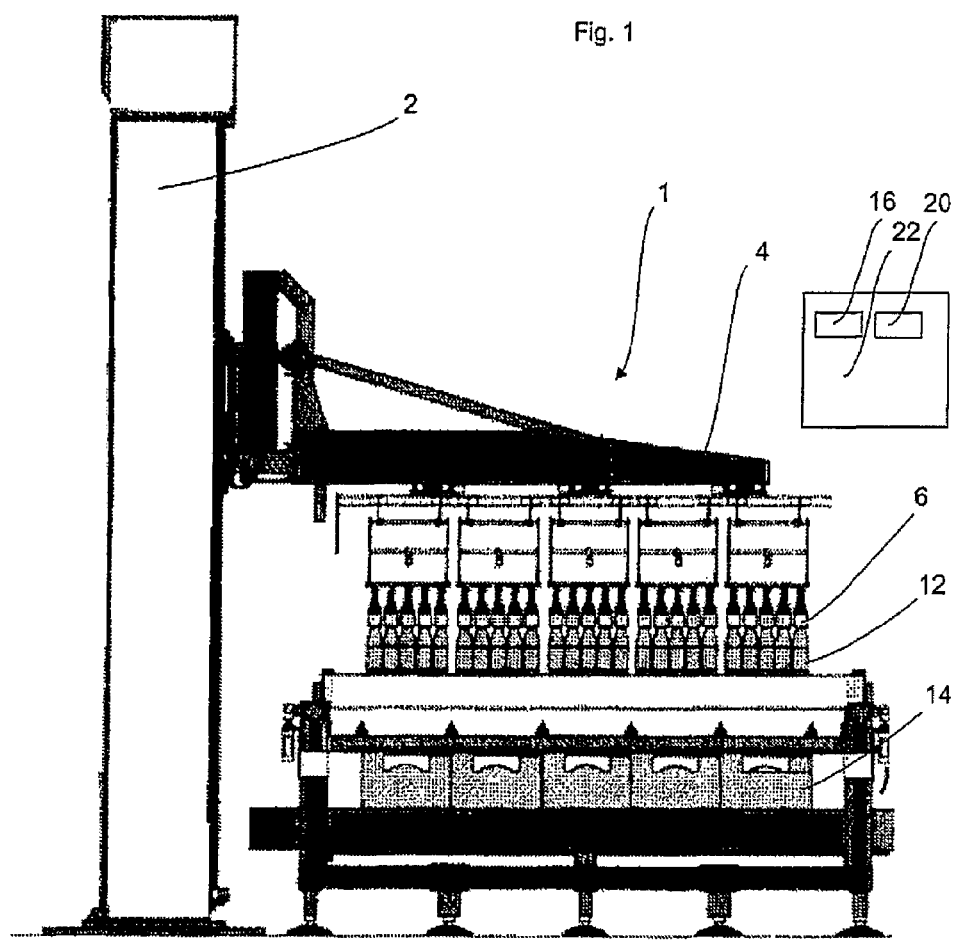
FIG. 1 shows a schematic view of an apparatus for gripping containers.

FIG. 1 shows an exemplary apparatus 1 for transporting containers. This apparatus 1 comprises a lifting column 2, on which a gripper head carrier 4 is arranged. This gripper head carrier 4 is thus movable in a vertical direction in FIG. 1. Furthermore, a horizontal axis is provided in order to be able to move the gripper head carrier 4 in the horizontal direction, here perpendicular to the plane of the paper. On the gripper head carrier 4, a plurality of gripping elements 6 are provided which in each case have a sensor device (not shown) which is able to ascertain an occupancy state of the respective gripping element 6 with a container 12. By means of this plurality of gripping elements 6, the containers 12 can be inserted into beverage crates 14 and/or removed from the latter.

The individual sensor devices output to a processor device 16 a signal which is characteristic of an occupancy state of the respective gripping element 6. The apparatus 1 as a whole carries out a plurality of corresponding operations one after the other, for example transporting a plurality of bottles 12 out of the beverage crates 14 or into said beverage crates 14. Over a plurality of such operations, statistics regarding the occupancy states of the individual gripping elements 6 are formed. These individual occupancy states are also stored in a memory device 20. Reference 22 denotes a display device for the occupancy states or for statistical values representing these occupancy states.

Figure 2:
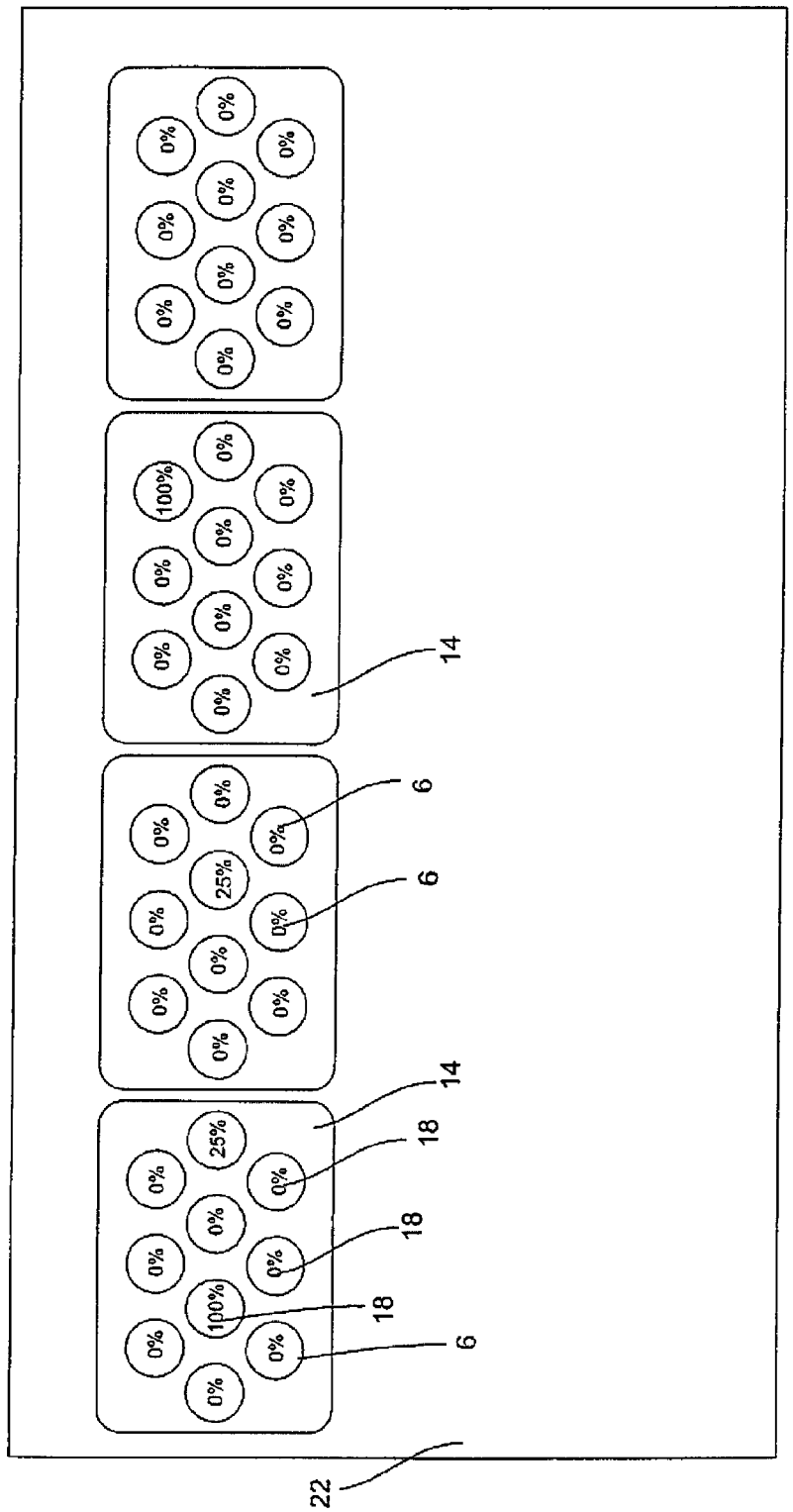
FIG. 2 shows a schematic view of a display for the individual gripping elements.

FIG. 2 shows one possibility for displaying the occupancy states. Here, a so-called four-line packing device is displayed, which serves for packing containers into four beverage crates. Reference 4 again denotes here a representation of the gripping elements, and the indicated numerical values 18, for example 0%, denote a (statistical) failure rate of the individual gripping element 6. It can be seen here that, for example in the left-hand crate 14, most statistics show the value 0%, which means that no failures exist here and thus the gripping elements were always occupied by containers. All of the containers 12 gripped by the gripping elements shown in FIG. 2 thus represent the above-described plurality of containers.

For one gripping element a failure rate of 100% is shown, which means that no container was gripped here at any time. This suggests a faulty gripping element, so that the user can quickly recognise that, in the second row of gripping elements, the gripping element which is second from the left is faulty. The gripping element which is located on the right in the second row has a failure rate of 25%. If, for example, the statistics here were formed over four operating sequences, this means that on one occasion no container was detected. This suggests that the gripping element itself is intact, but on one occasion no container could be picked up for other reasons, for example because it had become hooked onto the beverage crate. Statistics regarding the individual occupancy states of the individual gripping elements 6 can thus be output via the display device. In addition, it would be possible to identify those gripping elements which (with high probability) are faulty.

However, other relevant data may also be output in the display device 22, for example details regarding the type of beverage being processed, the total output or the production of said type. In addition, statistics or measured values may also be printed, output as speech or transmitted via radio.

It will be apparent to those skilled in the art that various modifications and variations can be made to the method and apparatus for checking gripping elements of the present disclosure without departing from the scope of the invention. Other embodiments of the invention will be apparent to those skilled in the art from consideration of the specification and practice of the invention disclosed herein. It is intended that the specification and examples be considered as exemplary only.

What is claimed is:

1. A method for checking gripping elements for containers, comprising:
    gripping a first plurality of containers with a plurality of gripping elements;
    gripping a second plurality of containers with the plurality of gripping elements;
    ascertaining a first occupancy state of at least one of the gripping elements with a container from the first plurality of containers;
    ascertaining a second occupancy state of the at least one gripping element with a container from the second plurality of containers;
    comparing the first occupancy state and the second occupancy state of the gripping element with a reference state, the reference state being a nominal occupancy state; and
    determining, when the first and second occupancy states are different from the reference state, that the at least one gripping element is faulty.

2. Method according to claim 1, further comprising ascertaining the first occupancy state and the second occupancy state of all the gripping elements.

3. Method according to claim 1, further comprising storing at least one of said occupancy states.

4. Method according to claim 1, further comprising ascertaining at least a third occupancy state of the gripping element with a container from a third plurality of containers.

5. Method according to claim 1, further comprising determining a functionality of the gripping element based on the comparison between the first occupancy state and the second occupancy state on the one hand and the reference state.

6. Method according to claim 1, further comprising statistically recording the occupancy states of at least one gripping element.

7. Method according to claim 1, further comprising ascertaining unoccupied gripping elements.

8. Method according to claim 1, further comprising determining the occupancy states once the gripping elements have released the containers.

9. Method according to claim 1, wherein the determining step includes determining, when the first and second occupancy states indicate that the at least one gripping element is not holding a container, that the at least one gripping element is faulty.

10. Apparatus for checking at least one of a plurality of gripping elements for containers, comprising:
    at least one gripping arrangement for gripping containers, having a sensor device configured to detect an occupancy state of the gripping arrangement with a container; and
    a processor device configured to receive a signal from said sensor device and to compare a first occupancy state of the gripping arrangement with a first container from a first plurality of containers and a second occupancy state of the gripping arrangement with a second container from a second plurality of containers with a reference state, the reference state being a nominal occupancy state,
    wherein, when the first and second occupancy states are different from the reference state, the processor determines that the gripping arrangement is faulty.

11. Apparatus according to claim 10, wherein the processor device is designed in such a way that it statistically evaluates the occupancy states of the gripping arrangement.

12. Apparatus according to claim 10, further comprising at least one additional gripping arrangement for gripping containers, each of said additional gripping arrangements has a sensor device that detects an occupancy state of the respective gripping arrangement with a container.

13. Apparatus according to claim 12, wherein the processor device is configured in such a way that it compares the occupancy states of all the gripping arrangements with containers of the first plurality of containers and the occupancy states of all the gripping arrangements with containers of the second plurality of containers with said reference state.

14. Apparatus according to claim 10, wherein the apparatus comprises a sensor device that retroactively detects an occupancy state of the gripping arrangement with a container.

15. Apparatus according to claim 10, wherein the apparatus comprises a memory device, in which the occupancy states of the gripping arrangement can be stored.

16. Apparatus according to claim 10, wherein, when the first and second occupancy states indicate that the gripping arrangement is not holding a container, the processor determines that the gripping arrangement is faulty.

\* \* \* \* \*